US009049647B1

(12) United States Patent
Ravuvari et al.

(10) Patent No.: US 9,049,647 B1
(45) Date of Patent: Jun. 2, 2015

(54) MANUAL PUBLIC LAND MOBILE NETWORK SEARCH PRIORITIZATION

(71) Applicant: QUALCOMM Incorporated, San Diego, CA (US)

(72) Inventors: Ankammarao Ravuvari, Hyderabad (IN); Venugopal Krishna Srinivasa Srungaram, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 14/136,164

(22) Filed: Dec. 20, 2013

(51) Int. Cl.
H04W 48/16 (2009.01)
H04W 76/02 (2009.01)
H04W 84/04 (2009.01)

(52) U.S. Cl.
CPC ............ *H04W 48/16* (2013.01); *H04W 76/028* (2013.01); *H04W 84/042* (2013.01)

(58) Field of Classification Search
CPC .. H04W 48/16; H04W 76/028; H04W 84/042
USPC ......................................................... 455/434
See application file for complete search history.

(56) References Cited

U.S. PATENT DOCUMENTS

| 8,244,301 | B2 | 8/2012 | Shi | |
| 2007/0004404 | A1* | 1/2007 | Buckley et al. | 455/434 |
| 2010/0197301 | A1* | 8/2010 | Islam et al. | 455/434 |
| 2013/0003699 | A1* | 1/2013 | Liu et al. | 370/331 |
| 2013/0058216 | A1 | 3/2013 | Krishnaswamy et al. | |
| 2013/0303240 | A1 | 11/2013 | Sanka et al. | |

FOREIGN PATENT DOCUMENTS

| CN | 1976516 A | 6/2007 |
| EP | 2472960 A1 | 7/2012 |
| EP | 2469897 B1 | 10/2012 |
| EP | 2512195 A1 | 10/2012 |
| EP | 2611238 A1 | 7/2013 |
| WO | 2010140781 A2 | 12/2010 |

OTHER PUBLICATIONS

"GT S6102-Packet data problems | Android Forums", Oct. 8, 2013, pp. 1-5, XP055169685, Retrieved from the Internet: URL: http://androidforums.com/threads/gt-s6102-packet-data-problems.599635/.

(Continued)

*Primary Examiner* — Asghar Bilgrami
(74) *Attorney, Agent, or Firm* — The Marbury Law Group, PLLC

(57) ABSTRACT

A method for performing manual public land mobile network (PLMN) search includes: receiving a command to perform manual PLMN search on an inactive subscription associated with a first subscriber identity module (SIM) of a communication device; determining if a data connection is enabled on an active subscription associated with a second SIM of the communication device; and if the data connection is not enabled on the active subscription, performing the manual PLMN search on the inactive subscription by tuning away from the active subscription to identify available operators associated with the first SIM.

20 Claims, 2 Drawing Sheets

(56) References Cited

OTHER PUBLICATIONS

"GT—S6102 user manual", Feb. 2012, pp. 1-142, XP055169653, Retrieved from the Internet: Url: http:// downloadcenter.samsung.com/content/UM/201202/20120220144300690/GT-S6102_UM_EU_Gingerbread_Eng_Rev.2.0_120217_Screen.pdf.

International Search Report and Written Opinion—PCT/US2014/069843—ISA/EPO—Feb. 23, 2015.

* cited by examiner

MANUAL PUBLIC LAND MOBILE NETWORK SEARCH PRIORITIZATION

FIELD

Aspects of the present disclosure relate generally to wireless communications, and more particularly to manual public land mobile network (PLMN) search prioritization for mobile devices having multiple subscriber identity modules (SIMs).

BACKGROUND

Wireless communication networks support communications for multiple users by sharing the available network resources. Some wireless devices are configured to facilitate communication on two separate networks via two separate subscriptions. For example, dual-Subscription Identity Module (SIM), dual standby (DSDS) devices may include two SIM cards—one card for a first subscription and a second card for a second subscription, and are capable of receiving services from two different networks.

Each SIM card may correspond to a subscription with a different service provider. Further, each subscription may be associated with one or more technology types. For example, a first subscription may support 2G communication technology such as Global System for Mobile communications (GSM), while the second subscription may support one or more 3G communication technologies such as Wideband Code Division Multiple Access (WCDMA). For various reasons, for example poor call or data reception, it may be advantageous to switch from one subscription to the other subscription.

Currently, multi-SIM devices do not support manual PLMN (MPLMN) search on one subscription while a data connection is active on another subscription.

SUMMARY

Apparatuses, systems, and methods for manual PLMN search prioritization for multi-SIM mobile devices are provided.

According to an aspect of the present invention there is provided a method for performing manual public land mobile network (PLMN) search. The method may include: receiving a command to perform manual PLMN search on an inactive subscription associated with a first subscriber identity module (SIM) of a communication device; determining if a data connection is enabled on an active subscription associated with a second SIM of the communication device; and if the data connection is not enabled on the active subscription, performing the manual PLMN search on the inactive subscription by tuning away from the active subscription to identify available operators associated with the first SIM.

According to another aspect of the present invention there is provided a communication apparatus. The communication apparatus may include: a control unit configured to control operation of the apparatus; a communication unit configured to transmit and receive radio frequency (RF) communication signals; a first subscriber identity module (SIM) containing identification information for a first communication network; a second SIM containing identification information for a second communication network; an interface device comprising an input device configured to receive a command to perform manual public land mobile network (PLMN) search on an inactive subscription associated with one of the first SIM and the second SIM; and a determination unit configured to determine whether a data connection is enabled on an active subscription associated with the other of the first SIM and the second SIM.

According to another aspect of the present invention there is provided a communication system. The communication system may include: a first communication network; a second communication network; a communication device including: a first subscriber identity module (SIM) containing identification information for the first communication network; a second SIM containing identification information for the second communication network; an interface device comprising display device and an input device configured to receive a command to perform manual public land mobile network (PLMN) search on an inactive subscription associated with one of the first SIM and the second SIM; and a control unit configured to control operation of the communication device.

Other features and advantages of the present inventive concept should be apparent from the following description which illustrates by way of example aspects of the present inventive concept.

BRIEF DESCRIPTION OF THE DRAWINGS

Aspects and features of the present inventive concept will be more apparent by describing example embodiments with reference to the accompanying drawings.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Figure 1:
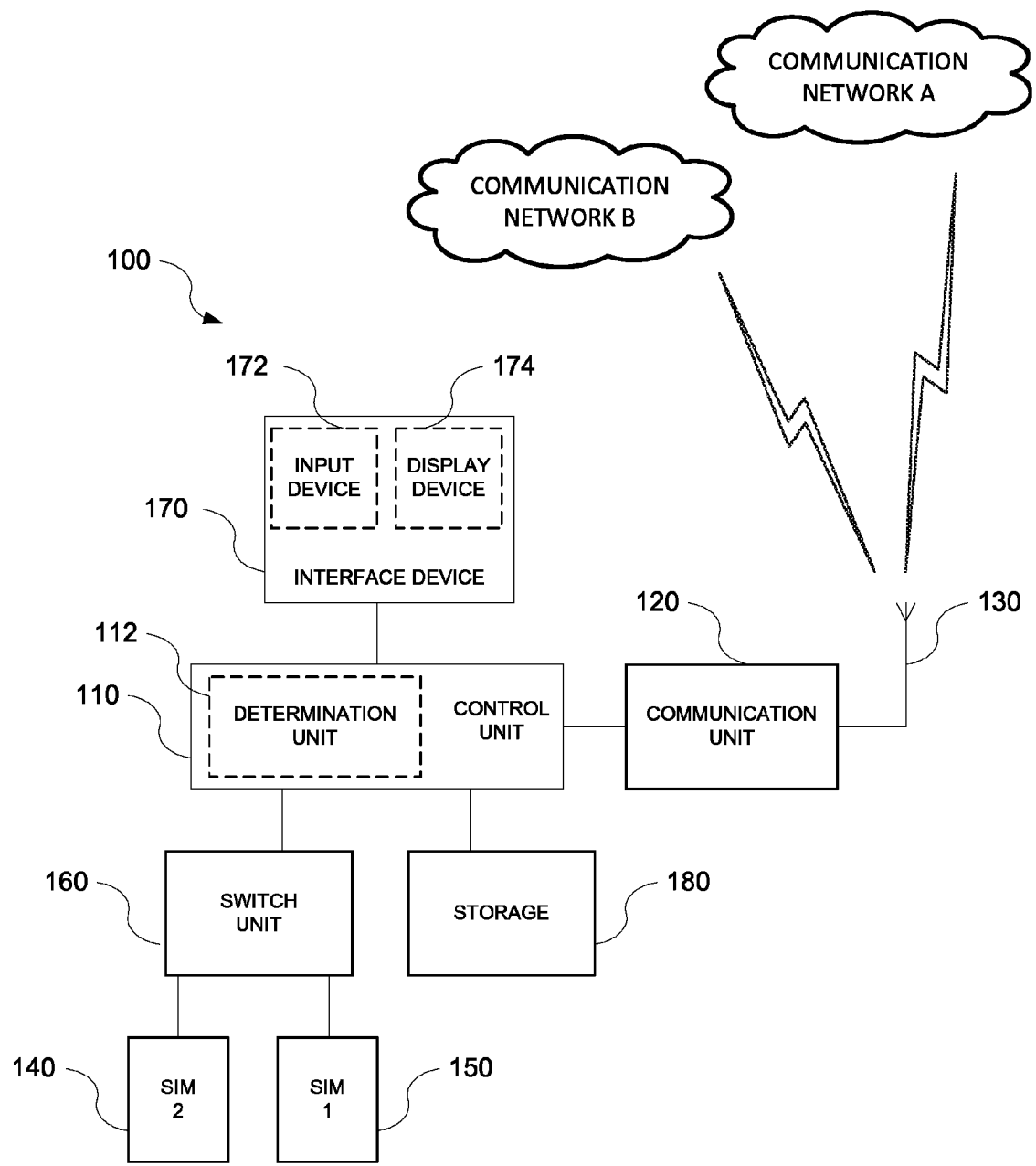
FIG. 1 is a block diagram illustrating a mobile device according to an example embodiment of the present inventive concept.

FIG. 1 is a block diagram illustrating a DSDS mobile device according to an example embodiment of the present inventive concept. As illustrated in FIG. 1, a mobile device 100 may include a control unit 110, a communications unit 120, an antenna 130, a first SIM 140, a second SIM 150, a switch unit 160, an interface device 170, and storage 180. The mobile device 100 may be, for example but not limited to, a mobile telephone, smartphone, tablet, computer, etc., capable of mobile communications with one or more wireless networks.

Referring to FIG. 1, the communication unit 120 transmits and receives radio frequency (RF) signals to and from wireless communication networks through the antenna 130. The first SIM 140 and the second SIM 150 contain subscriber identification information for network service subscriptions and are electrically connected to the control unit 110 through the switch unit 160. The switch unit 160 is configured to electrically connect the first SIM 140, the second SIM 150, or both the first and second SIM to the control unit 110.

The first and second SIMs 140, 150 each contain data necessary to subscribe the mobile device 100 to a communication network. For example, the first SIM 140 may subscribe the mobile device 100 with communication network A and the second SIM 150 may subscribe the mobile device 100 with communication network B. In some example embodiments, mobile devices may have more than two SIMs and may be capable of accessing services from more than two different networks.

Communication networks A and B may be operated by the same or different service providers, and/or may support the same or different technologies, for example, but not limited to, WCDMA and GSM. One of ordinary skill in the art will appreciate that any available combination of technologies and service providers will fall within the scope of the present inventive concept.

The control unit 110 controls overall operation of the mobile device 100 including control of the communications unit 120, switch unit 160, interface device 170, and storage 180. The control unit 110 may be a programmable device, for example, but not limited to, a microprocessor or microcontroller. The control unit 110 may include a determination unit 112 which determines whether a data connection is enabled on an active subscription. Alternatively, the determination unit 112 may be implemented as electronic circuitry separate from the control unit 110. The control unit 110 may control the switch unit 160 to select the first SIM 140 or the second SIM 150 based on which subscription is active. The storage 180 may store application programs necessary for operation of the mobile device 100 that are executed by the control unit 110, as well as application data and user data.

The interface device 170 may include an input device 172 and a display device 174. The input device 172 may be, for example, but not limited to, a keypad and/or a touch screen. The display device 174 may be, for example, but not limited to, a liquid crystal display (LCD). One of ordinary skill in the art will appreciate that other input and display devices may be used without departing from the scope of the present inventive concept.

Figure 2:
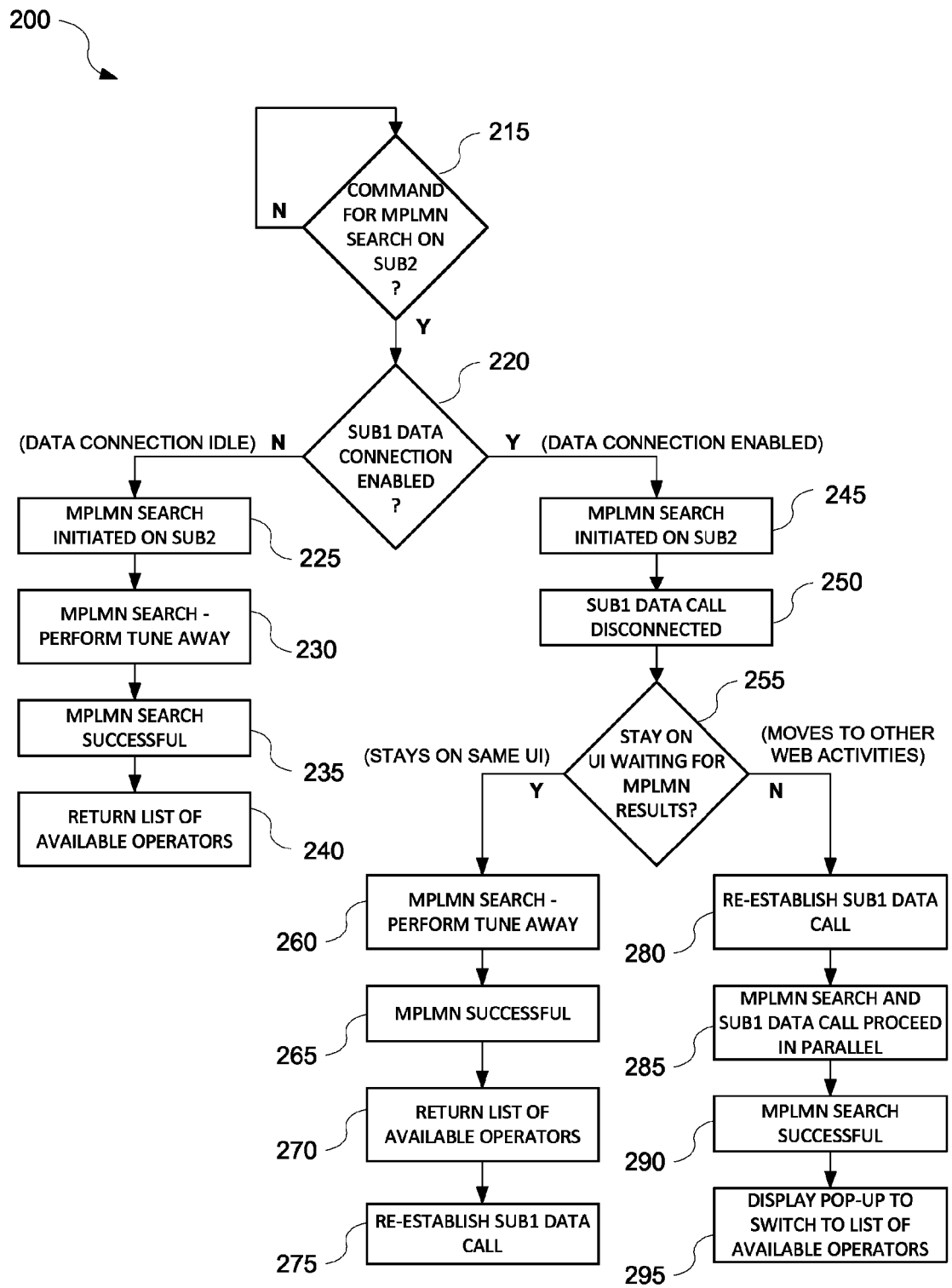
FIG. 2 is a flowchart illustrating operation of a DSDS mobile device during MPLMN search according to an example embodiment of the present inventive concept.

FIG. 2 is a flowchart illustrating operation of a DSDS mobile device during manual PLMN search according to an example embodiment of the present inventive concept. In the example illustrated in FIG. 2, subscription 1 is the active subscription and subscription 2 is the inactive subscription. Accordingly, in this example manual PLMN search is performed on subscription 2. One of ordinary skill in the art will appreciate that manual PLMN search may also be performed on subscription 1 when subscription 2 is the active subscription.

Referring to FIG. 2, the mobile device 100 receives a command to initiate manual PLMN search on the inactive subscription (215-Y). A determination is made whether a data connection is enabled on the active subscription, i.e., subscription 1 (220). The determination may be made by the determination unit 112 by monitoring data traffic on the active subscription or by any other suitable method known to those of ordinary skill in the art. If a data connection is not enabled on subscription 1 (220-N), the control unit 110 controls the communication unit 120 to perform manual PLMN search on subscription 2 (225).

During manual PLMN search, tune away is performed on subscription 2 and channel data, for example, but not limited to, signal strength and quality of service (QoS) data, as well as operator information of available operators associated with subscription 2 is received by the mobile device 100 (230). In an example embodiment, received signal strength (RSSI) on the bands supported by Subscription 2 may be calculated, and acquisition on the top few absolute radio frequency channel numbers (ARFCNs) attempted. If acquisition is successful, operator information including mobile country code (MCC), mobile network code (MNC), operator name, and whether or not that PLMN is forbidden may be obtained.

Upon successful completion of the manual PLMN search, a list of available operators associated with subscription 2 is returned and displayed on the display device 174 of the interface device 170 (240). The list of available operators may be displayed in rank order of, for example, but not limited to, QoS, strength of signal, etc.

If the determination unit 112 determines that the data connection is enabled on subscription 1 (220-Y), the control unit 110 initiates manual PLMN search on subscription 2 (245) and the data call on subscription 1 is disconnected (250). A determination is made by the control unit 110 whether the user stays on the same user interface (UI) from which the manual PLMN search is initiated or switches to other web activities while waiting for the manual PLMN search results (255).

If the user stays on the same UI from which the manual PLMN search is initiated (255-Y), the control unit 110 controls the communication unit 120 to perform the manual PLMN search on subscription 2 (260). During manual PLMN search, tune away is performed on subscription 2 and channel data, for example, but not limited to, signal strength and QoS data, as well as operator information for available operators associated with subscription 2 is received by the mobile device (265). In an example embodiment, received signal strength (RSSI) on the bands supported by Subscription 2 may be calculated, and acquisition on the top few ARFCNS attempted. If acquisition is successful, operator information including MCC, MNC, operator name, and whether or not that PLMN is forbidden may be obtained.

Upon successful completion of the manual PLMN search, a list of available operators is returned and displayed on the display device 174 of the interface device 170 (270), and the data call on subscription 1 is reestablished (275). The list of available operators may be displayed in rank order of, for example, but not limited to, QoS, strength of signal, etc.

If while waiting for manual PLMN search results the user moves on to other web activities, for example, but not limited to, web browsing or gaming (255-N), the control unit 110 reestablishes the data call on subscription 1 (280), and controls the communication unit 120 to perform the manual PLMN search and data transmission and reception on the subscription 1 data call in parallel (285). Parallel execution of the subscription 1 data call and the manual PLMN search may result in somewhat lower performance of the mobile device 100 during the parallel execution.

During manual PLMN search, tune away is performed on subscription 2 and channel data, for example, but not limited to, signal strength and QoS data, as well as operator information of available operators associated with subscription 2 is received by the mobile device (290). In an example embodiment, received signal strength (RSSI) on the bands supported by Subscription 2 may be calculated, and acquisition on the top few ARFCNS attempted. If acquisition is successful, operator information including MCC, MNC, operator name, and whether or not that PLMN is forbidden may be obtained.

Upon successful completion of the manual PLMN search, a list of available operators associated with subscription 2 is returned and a pop-up graphic is displayed on the display device 174 of the interface device 170 and provides an option to switch the UI display to view the results of the manual PLMN search (295). If the user elects to view the list, the list of available operators may be displayed in rank order of, for example, but not limited to, QoS, strength of signal, etc. Operators may also be listed in order of home PLMN (HPLMN), preferred PLMNs, then forbidden PLMNs.

While certain embodiments have been described, these embodiments have been presented by way of example only, and are not intended to limit the scope of the protection. The apparatuses, methods, and systems described herein may be embodied in a variety of other forms. Various omissions, substitutions, and/or changes in the form of the example apparatuses, methods, and systems described in this disclosure may be made without departing from the spirit of the protection.

The accompanying claims and their equivalents are intended to cover such forms or modifications as would fall within the scope and spirit of the protection. For example, the example apparatuses, methods, and systems disclosed herein can be applied to multi-SIM mobile devices subscribing to multiple communication networks and/or communication technologies. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for performing manual public land mobile network (PLMN) search, the method comprising:
   receiving a command to perform manual PLMN search on an inactive subscription associated with a first subscriber identity module (SIM) of a communication device;
   determining if a data connection is enabled on an active subscription associated with a second SIM of the communication device; and
   if the data connection is not enabled on the active subscription, performing the manual PLMN search on the inactive subscription by tuning away from the active subscription to identify available operators associated with the first SIM.

2. The method of claim 1, further comprising upon completion of the manual PLMN search returning a list of available PLMN operators and displaying the list on the communication device.

3. The method of claim 1, further comprising:
   if the data connection is enabled on the active subscription, disconnecting the data connection on the active subscription and performing the manual PLMN search on the inactive subscription by tuning away from the active subscription to identify available operators associated with the first SIM.

4. The method of claim 3, further comprising:
   determining if the user interface is switched from the user interface through which the manual PLMN search was initiated;
   reestablishing the data connection on the active subscription if the user interface is switched; and
   performing the manual PLMN search on the inactive subscription in parallel with transmitting and receiving data on the active subscription.

5. The method of claim 4, further comprising:
   displaying a pop-up message on the communication device indicating that results of the manual PLMN search are available; and
   providing an option to display the search results on the communication device.

6. The method of claim 3, further comprising:
   determining if the user interface is switched from the user interface through which the manual PLMN search was initiated;
   maintaining the disconnected state of the data connection on the active subscription if the user interface is not switched; and
   performing the manual PLMN search on the inactive subscription.

7. The method of claim 6, further comprising upon completion of the manual PLMN search returning a list of available PLMN operators and displaying the list on the communication device.

8. The method of claim 7, further comprising:
   reestablishing the data connection on the active subscription.

9. A communication apparatus, comprising:
   a control unit configured to control operation of the apparatus;
   a communication unit configured to transmit and receive radio frequency (RF) communication signals;
   an interface device comprising an input device configured to receive a command to perform manual public land mobile network (PLMN) search on an inactive subscription associated with one of a first subscriber identity module (SIM) containing identification information for a first communication network and a second SIM containing information identification for a second communication network; and
   a determination unit configured to determine whether a data connection is enabled on an active subscription associated with the other of the first SIM and the second SIM,
   wherein if the determination unit determines that a data connection is not enabled on the active subscription, the control unit controls the communication unit to perform the manual PLMN search on the inactive subscription by tuning away the communication unit from the active subscription to identify available operators associated with the inactive subscription.

10. The apparatus of claim 9, wherein the interface device further comprises a display device, and
    wherein upon completion of the manual PLMN search the control unit returns a list of available PLMN operators associated with the inactive subscription and causes the list to be displayed on the display device.

11. The apparatus of claim 9, wherein if the determination unit determines that a data connection is enabled on the active subscription, the control unit controls the communication unit to disconnect the data connection on the active subscription and to perform the manual PLMN search on the inactive subscription by tuning away the communication unit from the active subscription to identify available operators associated with the inactive subscription.

12. The apparatus of claim 11, wherein if the control unit determines that the user interface is switched from the user interface from which the manual PLMN search was initiated, the control unit reestablishes the data connection on the active subscription, and controls the communication unit to perform the manual PLMN search on the inactive subscription in parallel with transmitting and receiving data on the active subscription.

13. The apparatus of claim 12, wherein the control unit causes a pop-up message indicating that results of the manual PLMN search are available to be displayed on the communication apparatus.

14. The apparatus of claim 11, wherein if the control unit determines that the user interface is not switched from the user interface through which the manual PLMN search was initiated, the control unit controls the communication unit to maintain the disconnected state of the data connection on the active subscription and perform the manual PLMN search on the inactive subscription.

15. The apparatus of claim 14, wherein upon completion of the manual PLMN search the control unit returns a list of available PLMN operators associated with the inactive subscription and causes the list to be displayed on the communication apparatus.

16. The apparatus of claim 15, wherein upon completion of the manual PLMN search the control unit controls the communication unit to reestablish the data connection on the active subscription.

17. A communication system, comprising:
a first communication network;
a second communication network; and
a communication device comprising:
an interface device comprising display device and an input device configured to receive a command to perform manual public land mobile network (PLMN) search on an inactive subscription associated with one of a first subscriber identity module (SIM) containing identification information for a first communication network and a second SIM containing identification information for a second communication network; and
a control unit configured to control operation of the communication device,
wherein when a command is received via the interface device to perform manual PLMN search on an inactive subscription associated with one of the first and second communication networks, the control unit determines if a data connection is enabled on an active subscription associated with the other of the first and second communication networks, and
if the data connection is not enabled on the active subscription, the control unit controls the communication device to perform the manual PLMN search on the inactive subscription by tuning away from the active subscription to identify available operators associated with the one of the first and second communication networks.

18. The communication system of claim 17, wherein upon completion of the manual PLMN search the control unit returns a list of available PLMN operators on the inactive subscription associated with one of the first and second communication networks and causes the list to be displayed on the display device.

19. The communication system of claim 17, wherein if the control unit determines that a data connection is enabled on the active subscription, the control unit controls the communication device to disconnect the data connection on the active subscription and to perform the manual PLMN search on the inactive subscription by tuning away from the active subscription to identify available operators associated with the one of the first and second communication networks.

20. The communication system of claim 19, wherein if the control unit determines that the user interface is switched from the user interface through which the manual PLMN search was initiated, the control unit reestablishes the data connection on the active subscription, and controls the communication device to perform the manual PLMN search on the inactive subscription in parallel with transmitting and receiving data on the active subscription, and
wherein if the control unit determines that the user interface is not switched from the user interface through which the manual PLMN search was initiated, the control unit controls the communication device to maintain the disconnected state of the data connection on the active subscription and perform the manual PLMN search on the inactive subscription, and upon completion of the manual PLMN search the control unit controls the communication device to reestablish the data connection on the active subscription.

\* \* \* \* \*